United States Patent [19]

Duggins et al.

[11] 4,107,135

[45] Aug. 15, 1978

[54] DECORATIVE POLYMERIC ARTICLE CONTAINING FLOCK FIBERS

[75] Inventors: Ray B. Duggins, Chadds Ford, Pa.; Richard V. Westerman, Wilmington, Del.

[73] Assignee: E. I. Du Pont de Nemours and Company, Wilmington, Del.

[21] Appl. No.: 679,906

[22] Filed: Apr. 23, 1976

[51] Int. Cl.$^2$ ............................................. C08K 7/02
[52] U.S. Cl. .............................. 260/42.37; 260/42.52; 260/857 UN
[58] Field of Search .......... 260/42.37, 42.52, 857 UN, 260/40 R, 37 PC, 37 N, 37 EP

[56] References Cited

U.S. PATENT DOCUMENTS

| | | | |
|---|---|---|---|
| 2,550,650 | 4/1951 | Arnold | 260/857 UN X |
| 3,313,545 | 4/1967 | Bartsch | 260/42.37 X |
| 3,780,156 | 10/1973 | Cameron | 260/42.52 X |
| 3,847,865 | 11/1974 | Duggins | 260/42.52 |
| 3,931,094 | 1/1976 | Segal et al. | 260/37 N |
| 3,991,006 | 11/1976 | Chandler | 260/40 R |

*Primary Examiner*—Sandra M. Person

[57] ABSTRACT

A decorative polymeric article and a composition for its preparation are provided. The pleasing aesthetics of the article are realized by the combination of fillers such as alumina trihydrate and from about 0.01–2 percent by weight of the article of colored, very short fibers such as nylon flock. The overall translucency of the article provided by the alumina trihydrate enables the flock to impart a dappled effect to the article.

16 Claims, No Drawings

DECORATIVE POLYMERIC ARTICLE CONTAINING FLOCK FIBERS

BACKGROUND OF THE INVENTION

1. Field of Invention

This invention relates to filled, crosslinked polymers and more particularly to aesthetically pleasing, dappled polymeric articles containing alumina trihydrate filler and colored, short fibers.

2. Prior Art

Filled plastics and various methods for their manufacture into shaped articles is a well-developed art and involves many products. One such product is simulated marble. Simulated marble products based on filled poly (methyl methacrylate) are described in U.S. Pat. No. Re 27,093; U.S. Pat. No. 3,488,246; U.S. Pat. No. 3,642,975; U.S. Pat. No. 3,663,493 and U.S. Pat. No. 3,847,865. In the latter patent, the use of alumina trihydrate as a filler is described as producing an article which is translucent and gives a variety of advantageous properties to the article. Imparting color effects other than uniform shading, however, requires a relatively complicated process.

Glass fiber filled articles based on unsaturated polyesters are described for example in U.S. Pat. No. 3,903,343. In this patent the glass fibers comprise a large proportion, approximately 30% by weight, of the articles.

None of these references describes or suggests a polymeric article having a dappled effect of pleasing aesthetics.

SUMMARY OF THE INVENTION

According to the present invention there is provided a dappled article which contains:
(A) 20–70 parts by weight of a crosslinked polymer having a glass transition temperature of at least 70° C;
(B) 80–30 parts by weight of an inert filler; and
(C) 0.01–2 percent by weight of the article, of short, colored fibers.

There is also provided a composition of liquid consistency containing:
(A) 20–70 parts by weight of a monomer(s) or syrup, provided that the final polymer is crosslinked and has a glass transition temperature of at least 70° C;
(B) 80–30 parts by weight of an inert filler; and
(C) 0.01–2% by weight of (A) plus (B), of short, colored fibers.

DETAILED DESCRIPTION OF THE INVENTION

The polymer component of the article forming a solid matrix can be a homo- or copolymer of any of the following combination of monomers which can be polymerized, provided that the resulting polymer has a glass transition temperature of at least 70° C. Among the monomers which can be utilized in this invention are methyl methacrylate (which is preferred as a major constituent), other alkyl acrylates and methacrylates in which the alkyl groups can be from 1-18 carbon atoms, preferably 1-4 carbon atoms, styrene, substituted styrenes, vinyl acetate, acrylonitrile, methacrylonitrile, acrylic and methacrylic acids, 2-vinyl- and 4-vinylpyridines, maleic acid, maleic anhydride and esters of maleic acid, acrylamide and methacrylamide, itaconic acid, itaconic anhydride and esters of itaconic acid and the like, and mixtures thereof. Multifunctional monomers for crosslinking purposes can also be included, such as unsaturated polyesters, alkylene diacrylates and dimethacrylates, allyl acrylate and methacrylate, N-hydroxymethylacrylamide and N-hydroxymethylmethacrylamide, N,N'-methylene diacrylamide and dimethacrylamide, glycidyl acrylate and methacrylate, diallyl phthalate, divinylbenzene, divinyltoluene, trimethylolpropane triacrylate and trimethacrylate; pentaerythritol tetraacrylate and tetramethacrylate; triallyl citrate and triallyl cyanurate, and the like, and mixtures thereof. Any of the above monomers can be utilized provided that the resulting polymer has a glass transition temperature of at least 70° C.

Other polymers which have the required glass transition temperature of at least 70° C can also be used such as unsaturated polyesters, including styrenated and maleinated alkyds and oils (e.g. linseed oil), cellulose esters such as cellulose acetate and cellulose acetate butyrate; cellulose ethers such as ethyl cellulose; polyamides, polycarbonates, polyvinyl chlorides and copolymers, polyvinylidene chloride, polychloroprene, and thermosetting epoxy and melamine resins.

Crosslinking can also be introduced during the polymerization reaction through free radical attack on the polymer at sites available to such attack and any other conventional means known to those skilled in the art.

The compositions of this invention, for preparing the decorative dappled articles, are of liquid consistency suitable for molding in a continuous sheet process or in a batch process. The compositions contain all of the ingredients necessary for forming the articles of this invention except the initiator system required for the polymerization.

The initiator system utilized in preparing the articles of this invention are those known in the art. A preferred initiator system is one described in U.S. Pat. No. 3,847,865, comprising a salt of a hemi-perester of maleic acid and a mercapto-chain transfer agent. Another preferred system, described in a now allowed patent application, R. S. Dudinyak, Ser. No. 615,722, filed Sept. 22, 1975, hereby incorporated by reference, comprises a salt of a hemi-perester of maleic acid and a salt of an oxo-acid of sulfur. The initiator system can be added to and mixed with, the pourable composition just prior to the molding process. The polymerization reaction begins by simply exposing the mix to a temperature of approximately 15°–50° C and results in the articles of this invention having the filler and the flock dispersed in the solid matrix polymer.

During the preparation of the dappled decorative article of this invention polymer syrups can also be utilized. Combination of the above described polymers and monomers can be utilized provided that the polymer is soluble in the monomer(s) and further provided that the resulting polymer has a glass transition temperature of at least 70° C.

Among the preferred articles of this invention are articles based on polymers containing methyl methacrylate as the major monomer component. For purposes of illustration, much of the subsequent description of the polymer matrix from which the articles are prepared, the process of preparing and the inventive articles themselves will be in terms of methyl methacrylate containing systems.

The ingredients and method of preparing a methyl methacrylate polymer article using alumina trihydrate filler are described in the aforesaid U.S. Pat. No. 3,847,865, issued Nov. 12, 1974, to R. B. Duggins, which is hereby incorporated by reference. The polymer in the article can be methyl methacrylate homopolymer or a copolymer of methyl methacrylate with at least one other alpha, beta-ethylenically unsaturated compound, the copolymer preferably containing more than about 50 percent by weight of methyl methacrylate. Representative other monomers are vinyl acetate, styrene, alkyl acrylates, alkyl methacrylates, acrylonitrile, multifunctional acrylic monomers such as alkylene diacrylates and alkylene dimethacrylates. The methyl methacrylate polymer can be introduced into the article as a polymerizable polymer-in-monomer syrup as described in the aforesaid U.S. Pat. No. 3,847,865.

In the present invention, it has been found that a pleasingly aesthetic article can be prepared when a small amount of colored, short fibers (flock) is dispersed throughout the article. The combination of the translucency imparted by the alumina trihydrate filler and the color imparted by the fibers gives a dappled effect to the article.

While the short fibers used can be any of the commercially available wool or cotton flocks or any short fibers readily prepared by chopping continuous filament or longer fibers, it is preferred that the short fibers be made of polymers which are strong or weatherable such as nylon, aramid, acrylic, polyester, polyolefin, and natural. The concentration of the fibers in the article is from about 0.01-2 percent by weight of the article, preferably about 0.05-1 percent. The fibers must be short enough so that they can easily be dispersed in the pourable mix used to make the article. The length of the fibers should normally be in the range of about 10-500 mils, preferably 10-125 mils; however, there can be fibers present longer than this stated range, e.g., up to 1 inch (approximately 2.5 centimeters). Normally, the short fibers will have a denier of about 1-300, preferably 1-48.

The short fibers used must also have color either through dyeing or pigmentation. Any desired color can be used. For purposes of this invention, black is considered to be a color. The intensity of the color and the dappled effect can be increased or decreased by increasing or decreasing the amount of dye in the fibers or by increasing or decreasing the concentration of the fibers in the article. For example, with dark colored fibers, the concentration can be less than for light colored fibers. Fibers of mixed color can also be utilized. Also, it has been found that once the dye solution used to color nylon fibers reaches a concentration of 6 percent by weight of dye, substantially no further change in color is noticed at constant fiber concentration since the fibers are apparently saturated with dye.

Colored fibers are distributed randomly within the material. This provides a large number of color sites having varied intensity depending upon their depth below the viewing surface and upon the translucency of the fillers.

This visibility of colored fibers at substantial depths within the article, as well as at or near the surface, creates a texture of varying intensities of color when viewed at very close distances. However, when the surface is viewed at distances of several inches or more, the variegations are muted and have a pleasing softness and lack of sudden contrasts and the color of the fibers dominates. This dappled effect imparted to the articles of this invention provides an aesthetically pleasing appearance.

Fillers, such as alumina trihydrate, which is translucent, soften the contrast between the color sites and the surrounding matrix, whereas in simulated marble articles, they serve to intensify the contrast between a pigment-containing veining stream and the matrix.

When a substantially opaque filler such as calcium carbonate is substituted for the alumina trihydrate, the visibility of the colored fibers at or near the surface is much increased over that in the depths of the articles. Consequently the area of visible color (assuming the same amount of fibers) is reduced, and the contrast between the color sites and the surrounding matrix is increased. When a mixture of a translucent and an opaque filler is used, different levels of contrast can be obtained for the articles of this invention.

Optionally, other pigments can also be added to the mix from which the articles of this invention are prepared. For example, small amounts of $TiO_2$ can be utilized to minimize color variations in the final product. When thin sheets are prepared, $TiO_2$ can be added to add opacity to the transparent sheets.

In preparing the pourable mix used to make the article of the invention, e.g., a bathroom vanity top and sink, or kitchen or bathroom countertop, it is preferred that the short fibers be added to the methyl methacrylate syrup before the filler and other ingredients are added in order to break up any clumps of fibers present and to easily disperse the fibers throughout the syrup and resulting mix. The other ingredients can be added as is known in the art.

Although the sequence of mixing of the ingredients, i.e. syrup, filler and fibers, is not of vital importance and mixing of large batches is also contemplated, it is preferred that the ingredients be continuously mixed during the preparation of the article of this invention in order to obtain uniform distribution of the flock. It has been found that both the filler and the flock can be separately added to a stream of the syrup. This enhances continuous mixing together with substantial uniformity and reproducibility of color. The initiator system is then added at or near the end of the stream just prior to the molding step.

The preferred filler to be utilized in this invention is alumina trihydrate for greatest translucency of the article, although mixtures of other fillers with alumina trihydrate can also be used. Other fillers such as silica, alumina, calcium carbonate, $TiO_2$, ground mica, and the like, can also be used. The filler utilized must be inert. By inert filler is meant such a filler which is substantially unaffected by the other ingredients present during the preparation of the dappled articles of this invention and are also substantially unaffected by the polymerization process itself. The article can contain 30-80 parts, and preferably 40-70 parts, by weight of a filler.

The dappled articles of this invention can be prepared by conventional methods. In a continuous sheet process, the pourable mix can be introduced onto a moving belt which is covered with a release agent such as polyvinyl alcohol. The belt moves along within retaining side walls to prevent the mix from run-off. The mix can also be poured into variously shaped molds. The articles so formed take on the given shape thereby producing articles useful for a variety of applications. While appropriately placed protrusions afford articles with, in the case of, e.g. bathroom counter tops and sinks, the requisite orifices, the articles of this invention exhibit good machinability to allow drilling, cutting, sanding, etc. as required.

The dappled articles of this invention have excellent physical properties which make them uniquely suitable for applications requiring weatherability and resistance to attack or staining by household chemicals and the general abuse such as scratching and scouring many of the articles are exposed to during their service life. Because the dappled effect is not only a surface property of the articles of this invention, these articles can have their surfaces repaired without creating a fuzzy surface appearance.

The articles of this invention can be tested under a variety of simulated use conditions to determine performance and especially to ascertain whether the presence of the flock in the articles detracts from overall properties whem compared to simulated marble.

When samples of dappled articles, containing yellow nylon flock, were soaked in water at room temperature for 5 months; it was found that the nylon did not bloom nor did it cause swelling of the articles at or near the surface.

To determine blush, samples can be soaked for 16 hours in a 70° C water bath. A passing sample will not blush or turn white.

Stain resistance can be measured as follows:

Specimen(s) are conditioned by wet rubbing with household scouring powder and cheesecloth using at least 20 scrub cycles. Apply approximately two drops of each of the liquid reagents listed below and a similar amount of the solid reagents to the test specimen(s). Conduct one test with each reagent uncovered and the other with each reagent covered with a small watch glass to prevent evaporation and to insure contact with the test specimen(s). Allow the specimen(s) to remain for the prescribed time duration at a temperature of 23° C ± 2° C and a relative humidity of 50 ± 5 percent. At the end of the appropriate time interval, remove the excess reagents by blotting lightly with a paper towel.

| Reagents | Time |
| --- | --- |
| Black crayon | 16 hrs |
| Black liquid shoe polish | 16 hrs |
| Blue washable ink | 16 hrs |
| Gentian violet solution | 16 hrs |
| Lipstick (contrasting color; from Avon) | 16 hrs |
| Hair dye (contrasting color; from Miss Clairol) | 16 hrs |
| Cigarette | 16 hrs |
| Toothpaste | 16 hrs |
| Coffee | 16 hrs |
| Tea | 16 hrs |
| Mustard | 16 hrs |
| Bleach | 16 hrs |
| Nail polish remover | 16 hrs |
| Iodine solution (alcohol containing 1 percent iodine) | 4 hrs |
| Iodine solution (alcohol containing 1 percent iodine) | 16 hrs |

The stain specimen(s) shall be subjected to cleansing tests immediately after the period shown above and rated at that time. Each stain, both covered and uncovered, shall be given a number in accordance with the following rating procedure:

(1) Wash the specimen with tap water and cheesecloth using 20 scrub cycles with normal hand pressure. Dry by blotting. A stain is defined as a change in surface texture or a change in color. Specimens not staining at this point shall have a rating of 1, nonstaining.

(2) Stains present after initial water wash shall be washed with alcohol (commercial rubbing alcohol) or naphtha (lighter fluid) using cheesecloth with 20 scrub cycles with normal hand pressure. Wash with tap water and dry by blotting. Specimens not staining at this point shall have a rating of 2, removable by alcohol or naphtha.

(3) Stains present after above cleanings shall be scrubbed 20 scrub cycles with household scouring powder and wet cheesecloth using normal hand pressure. Wash with tap water and dry by blotting. Reduction of gloss due to scrubbing with household scouring powder does not constitute staining. Specimens whose stain is removed by household scouring powder shall have a rating of 3, removable by first application of household scouring powder.

(4) Stains present after above cleanings shall be scrubbed an additional 40 scrub cycles with household scouring powder and wet cheesecloth using normal hand pressure. Wash with tap water and dry by blotting. Reduction of gloss due to scrubbing with household scouring powder does not constitute staining. Specimens whose stain is removed by this additional cleaning shall have a rating of 4, removable by two household scouring powder scrubbings.

(5) Any specimen with stain remaining after the above cleanings shall have a rating of 5.

In general, the articles of this invention have excellent machinability as observed during cutting, drilling, and sanding operations.

If desired, color intensity can be measured with commercially available colorimeters both on the finished articles and after scouring the surfaces of the articles to determine color change, if any. Most importantly, however, since the dappled articles of this invention are often utilized in the home, observation with the naked eye is the best test of the pleasing aesthetics.

The invention can be further understood by the following examples in which parts and percentages are by weight unless otherwise indicated.

EXAMPLES 1-5

Five mixes are made containing 65% alumina trihydrate filler and 0.1, 0.2, 0.3, 0.5, and 0.8 percent, respectively, of yellow nylon flock. The flock is made up of fibers 40 mils in length and 3 denier which were dyed from a yellow dye solution having a dye concentration of 3 percent.

For each mix, the ingredients are as follows:

| Ingredients | Parts |
| --- | --- |
| Methyl methacrylate syrup, 18% polymer in monomer, containing 1% ethylene glycol dimethacrylate (42 centipoises, Brookfield viscometer, spindle #1, 30 rpm) | 674 |
| Yellow flock | 2,4,6,10,16 |
| Alumina trihydrate (Alcoa C-33) | 1284 |
| t-butyl peroxy maleic acid | 14.6 |
| Water | 1.6 |
| Ca(OH)$_2$, 30% slurry in syrup | 22.2 |
| Ethylene glycol dimercaptoacetate | 2.12 |

Before the addition of the last two ingredients, each mix is evacuated and heated to 40° C. The addition of the last two ingredients results in an exothermic reaction of approximately 9 minutes duration. The maximum temperature reached is 120°–124° C. in all cases.

Samples are prepared by pouring each mix into an 8 × 8 inches × ¾ inch mold preheated to 40° C. Each mold is lined with a polyvinyl alcohol film.

The samples are comparable in physical properties to a sample prepared without flock. In each sample, the flock is dispersed throughout. The samples are translucent, varied in yellow color intensity, and have pleasing aesthetics due to a dappled effect. Below are shown the test data for samples containing 0.3% flock and comparison data for control sample containing no flock but otherwise identical to flocked samples:

| Test Results | 0.3% flock | Control |
|---|---|---|
| Blush | pass | pass |
| Stain resistance: | | |
| crayon | 3 | 3 |
| liquid shoe polish (black) | 3 | 3 |
| washable ink (blue) | 3 | 3 |
| Gentian violet | 4 | 3 |
| lipstick | 3 | 2 |
| hair dye | 3 | 3 |
| cigarette | 4 | 3 |
| toothpaste | 5 | 5 |
| coffee | 1 | 1 |
| tea | 3 | 3 |
| mustard | 1 | 1 |
| bleach | 1 | 1 |
| nail polish remover | 3 | 3 |
| iodine solution (4 hrs) | 3 | 3 |
| iodine solution (16 hrs) | 3 | 3 |
| Hardness (Rockwell M, ASTM-D-785-65) | 93 | 93.5 |
| 60° gloss (machine direction) | 20 | 21 |

The data show no deterimental effects on the physical properties of simulated marble from the flock included to create the dappled effect.

EXAMPLE 6

The procedure of Example 1 is repeated except the nylon flock is varied in denier and length, dyed with different color dyes from solutions of varying concentrations, and added to the mix at varying concentrations. All samples had a pleasing dappled effect showing the colors of the flock utilized in proportion to the flock concentration.

| | Flock | | Dye | |
|---|---|---|---|---|
| Denier | Length (mils) | Percent Concentration | Color* | Sol. conc. % |
| 3 | 40 | 0.2 | Blue NSGL | 4 |
| 3 | 55 | 0.2 | Blue 22192 | ? |
| 3 | 55 | 0.2 | Green 42138 | ? |
| 3 | 30 | 0.05 | Ingalan yellow | 4 |
| " | " | 0.2 | " | 1 |
| " | " | " | " | 2 |
| " | " | " | " | 4 |
| 6 | 100 | 0.16 | Gold | ? |
| 6 | 100 | 0.3 | Yellow | 4 |
| 48 | 100 | 0.3 | Yellow | ? |
| 18 | 100 | 0.2 | Yellow | 6 |

*The dyes are commercial materials available from Sandoz Colors and Chemicals (New Jersey).

What is claimed is:

1. A dappled article consisting essentially of:
(A) 20–70 parts by weight of a crosslinked polymer having a glass transition temperature of at least 70° C;
(B) 80–30 parts by weight of an inert filler; and
(C) 0.01–2 percent by weight of the article, of short, colored fibers having a length of approximately 10–500 mils and a denier of about 1–300.

2. The article of claim 1 wherein said polymer is prepared from at least one monomer selected from the group consisting of: acrylic acid, methacrylic acid, alkyl acrylates and methacrylates having 1–18 carbon atoms in the alkyl group, styrene, substituted styrenes, vinyl acetate, acrylonitrile, methacrylonitrile, 2-vinylpyridine, 4-vinylpyridine, vinyl chloride, maleic acid, maleic anhydride, esters of maleic acid, acrylamide, methacrylamide, vinylidene chloride, itaconic acid, and esters of itaconic acid and from at least one other monomer selected from the group consisting of alkylene diacrylates, alkylene dimethacrylates, allyl acrylate, allyl methacrylate, glycidyl acrylate, glycidyl methacrylate, diallyl phthalate, divinyl toluene, trimethylolpropane triacrylate, trimethylolpropane trimethacrylate, pentaerythritol tetraacrylate, pentaerythritol tetramethacrylate, triallyl cyanurate, N-hydroxymethylacrylamide, N-hydroxymethylmethacrylamide, N,N'-methylenediacrylamide and N,N'-methylenedimethacrylamide.

3. The article of claim 1 wherein said polymer is based on at least one member of the group consisting of: unsaturated polyesters, cellulose esters, cellulose ethers, polyamides, polycarbonates, epoxy resins and melamine resins.

4. The article of claim 1 wherein said polymer is crosslinked poly(methyl methacrylate).

5. The article of claim 1 wherein said inert filler is at least one member of the group consisting of alumina trihydrate, alumina, silica, calcium carbonate, mica and titanium dioxide.

6. The article of claim 1 wherein said fibers are selected from the group consisting of nylon, aramid, polyester, acrylic, polyolefin, and natural.

7. The article of claim 6 wherein the fibers are present at a concentration of 0.05–1 percent by weight of the article.

8. A dappled article consisting essentially of:
(A) 30–60 parts by weight of a crosslinked polymer having a glass transition temperature of at least 70° C;
(B) 40–70 parts by weight of an inert filler; and
(C) 0.05–1 percent by weight of the article, of colored fibers having a length of approximately 10–500 mils and a denier of about 1–300.

9. The article of claim 8 wherein said crosslinked polymer is a copolymer of at least 50% by weight, based on the weight of the polymer, of methyl methacrylate, at least one other alpha,beta-ethylenically unsaturated monomer, and at least one multifunctional monomer.

10. The article of claim 8 wherein said crosslinked polymer is prepared from an unsaturated polyester.

11. A dappled article consisting essentially of:
(A) 30–60 parts by weight of crosslinked poly(methyl methacrylate);
(B) 40–70 parts by weight of alumina trihydrate; and
(C) 0.05–1 percent by weight of short, colored nylon fibers having a length of approximately 10–500 mils and a denier of about 1–300.

12. A dappled article consisting essentially of:
(A) 20–70 parts by weight of a crosslinked polymer having a glass transition temperature of at least 70° C. wherein said polymer is prepared from at least one monomer selected from the group consisting of: acrylic acid, methacrylic acid, alkyl acrylates and methacrylates having 1–18 carbon atoms in the alkyl group, styrene, substituted styrenes, vinyl acetate, acrylonitrile, methacrylonitrile, 2-vinylpyridine, 4-vinylpyridine, vinyl chloride, maleic acid, maleic anhydride, esters of maleic acid, acrylamide, methacrylamide, vinylidene chloride, itaconic acid, and esters of itaconic acid and from at least one other monomer selected from the group consisting of alkylene diacrylates, alkylene dimethacrylates, allyl acrylate, allyl methacrylate, glycidyl acrylate, glycidyl methacrylate, diallyl phthalate, divinyl toluene, trimethylolpropane triacrylate, trimethylolpropane trimethacrylate, pentaerythritol tetracrylate, pentaerythritol tetramethacrylate, triallyl cyanurate, N-hydroxymethylacrylamide, N-hydroxymethylmethacrylamide, N,N'-methylenediacrylamide and N,N'-methylenedimethacrylamide;

(B) 80–30 parts by weight of an inert filler selected from the group consisting of alumina trihydrate, alumina, silica, calcium carbonate, mica, titanium dioxide, and mixtures thereof;

(C) 0.01–2 percent by weight of the article of short, colored fibers having a length of approximately 10–500 mils and a denier of about 1–300 selected from the group consisting of nylon, aramide, polyester, acrylic polyolefin, and natural.

13. A composition of liquid consistency comprising:
(A) 20–70 parts by weight of a polymerizable polymer-in-monomer syrup; admixed with
(B) 80–30 parts by weight of an inert filler; and
(C) 0.01–2 parts by weight of the total composition of short, colored fibers having a length of approximately 10–500 mils and a denier of about 1–300;
wherein the resulting polymer has a glass transition temperature of at least 70° C.

14. The composition of claim 13 wherein said resulting polymer contains more than 50% by weight of the polymer, of methyl methacrylate.

15. A composition of liquid consistency comprising:
(A) 30–60 parts by weight of a poly(methyl methacrylate)-in-methyl methacrylate syrup; admixed with
(B) 70–40 parts by weight of alumina trihydrate; and
(C) 0.05–1 percent by weight, based on the weight of the composition, of short, colored nylon fibers having a length of approximately 10–500 mils and a denier of about 1–300.

16. The process for preparing the dappled article of claim 1 comprising the steps of separately adding, to a stream of polymerizable polymer-in-monomer syrup, an inert filler, and short, colored fibers, followed by an initiator system and finally exposing the mix to a temperature of 15–50° C.

* * * * *